United States Patent
Proulx et al.

(10) Patent No.: US 8,040,822 B2
(45) Date of Patent: Oct. 18, 2011

(54) CONFIGURING COMMUNICATION SERVICES USING POLICY GROUPS

(75) Inventors: Denis Armand Proulx, Ottawa (CA); Reda Laichi, Ottawa (CA)

(73) Assignee: Alcatel Lucent, Paris (FR)

( * ) Notice: Subject to any disclaimer, the term of this patent is extended or adjusted under 35 U.S.C. 154(b) by 183 days.

(21) Appl. No.: 12/478,572

(22) Filed: Jun. 4, 2009

(65) Prior Publication Data

US 2010/0309907 A1   Dec. 9, 2010

(51) Int. Cl.
*H04L 12/28* (2006.01)
(52) U.S. Cl. ........................ 370/254; 370/255
(58) Field of Classification Search .......... None
See application file for complete search history.

(56) References Cited

U.S. PATENT DOCUMENTS

| 7,352,853 | B1 * | 4/2008 | Shen et al. | 379/201.12 |
| 7,467,227 | B1 * | 12/2008 | Nguyen et al. | 709/239 |
| 2008/0059635 | A1 * | 3/2008 | Seiferth et al. | 709/226 |

OTHER PUBLICATIONS

Bryant et al., Psuedo Wire Emulation Edge-to-Edge (PWE3) Architecture, Overture Networks, Inc., The Internet Society, Mar. 2005.

\* cited by examiner

*Primary Examiner* — Robert Wilson
(74) *Attorney, Agent, or Firm* — Kramer & Amado P.C.

(57) ABSTRACT

The invention is directed to configuring services in a packet switching network. Embodiments of the invention group existing service policies configured on network routers into policy groups, thereby enabling better management of service policies and policy overrides. This functionality can be useful for identifying redundant policies that may be eliminated by reconfiguring one or more of the network routers to reduce the overall network-wide number of policies, as well as provisioning new services in a manner that efficiently uses existing policies.

15 Claims, 3 Drawing Sheets

CONFIGURING COMMUNICATION SERVICES USING POLICY GROUPS

FIELD OF THE INVENTION

The invention is directed to packet switching networks (PSN), particularly to configuring services thereon using policies.

BACKGROUND OF THE INVENTION

Virtual Leased Line (VLL) is a service for providing Ethernet based point to point communication over Internet Protocol (IP) and Multi Protocol Label Switching (MPLS) networks (IP/MPLS). This technology is also referred to as Virtual Private Wire Service (VPWS) or Ethernet over MPLS (EoMPLS). VLL service provides a point-to-point connection between two Customer Edge (CE) routers. It does so by binding two attachment circuits (AC) to a pseudowire that connects two Provider Edge (PE) routers, wherein each PE router is connected to one of the CE routers via one of the attachment circuits. VLL typically uses pseudowire encapsulation for transporting Ethernet traffic over an MPLS tunnel across an IP/MPLS backbone. More information on pseudowires can be found in "Pseudo Wire Emulation Edge-to-Edge (PWE3) Architecture", RFC3985, IETF, March 2005, by S. Bryant and P. Pate.

Virtual Private LAN Service (VPLS) is an Ethernet service that effectively implements closed user groups via VPLS instantiations. In order to achieve full isolation between the user groups, VPLS dedicates a separate database, usually in the form of a forwarding information base (FIB), on network routers per VPLS instance. Each VPLS instance further requires that a dedicated mesh of pseudowire tunnels is provisioned between PE routers that are part of the VPLS.

Both VLL and VPLS services use Service Access Points (SAP) to bind tunnel endpoints at PE routers ports to their respective service. For example, in the case of VPLS service a SAP would specify physical identifiers (e.g. node, shelf, card, port) of the corresponding port and an identifier (e.g. VLAN5) of the VPLS.

Services such as VPLS and VLL services provide the capability to securely communicate data packets among routers provisioned with the same service. Typically, thousands of such services are provisioned on a network, the data packet traffic that they each carry being kept separate from one another via special treatment provided at each router on which an instantiation of that service has been provisioned.

Each service has physical characteristics that in part define the service. These characteristics, also referred to a quality of service (QoS) parameters, include constant information rate (CIR), peak information rate (PIR), and maximum burst size (MBS) parameters and are often grouped into a policy for convenient provisioning of a service on a given router.

A service access point (SAP) provisioned on a router is used to associate a service instance with a port of the router and a policy. A SAP can also associate an override with a policy, wherein a value of one of the QoS parameters is specified to be used instead of the value for that QoS parameter defined by the associated policy.

Although policies and policy overrides are local to a router, it is desirable to define and use them on a network-wide basis for consistency. However, in a large network with thousands of routers, each having dozens of ports, and the even larger number of unique combinations of QoS parameter values that can be defined and assigned to these ports, limitations on the maximum number of policies that a network management (NM) system managing the network can support are easily exceeded. Using policy overrides to alleviate this problem only exacerbates difficulties in achieving network-wide consistency in the provisioning of services. Furthermore, since policies and policy overrides can be provisioned both locally at a router and centrally via a network management system, keeping the provisioning of services in synchronization at a NM system and network routers is difficult. Therefore, a means of configuring services on a PSN in a manner that ameliorates one or more of the aforementioned problems is desired.

SUMMARY OF THE INVENTION

The invention is directed to configuring services in a packet switching network. Embodiments of the invention group existing policies configured on network routers into policy groups, thereby identifying redundant policies that may be eliminated by reconfiguring one or more of the network routers to reduce the overall network-wide number of policies. This functionality aims at efficient use of NM system resources to help avoid exceeding NM system policy limits.

One embodiment of the invention takes policy overrides into account during the grouping operation so that the policy overrides can be eliminated during the reconfiguration. This functionality aims at promoting consistent use of policies on a network-wide basis.

In one embodiment the grouping and reconfiguration is responsive to configuration changes initiated locally at a router, which are learned of via event notification from a NM system. This functionality aims at keeping router and NM system policies used in configuration of services in synchronization.

According to an aspect of the invention a method of configuring a service in a packet switching network is provided. The method includes the steps of: executing automatically instructions stored on a computer readable media, the instructions when executed causing a sequence of steps to be performed, the sequence comprising the steps of: determining a service access point to be affected by configuration of the service; obtaining policing information associated with the service access point from a router of the switching network; assigning the service access point to a policy group depending upon the policy information; updating, on the router in accordance with the assignment, provisioning information associated with the service access point to configure the service.

According to another aspect of the invention a system for configuring a service in a packet switching network is provided. The system comprises a service platform for executing a service application stored thereon, the service platform comprising: means for communicatively coupling to a network management entity of the packet switching network via an operating system interface; and a service database for storing a plurality of policy groups and their associated policies, wherein the service application comprises instructions stored on computer readable media to be executed by the service platform to cause a sequence of actions to be performed in cooperation with the management entity, the actions comprising: determining a service access point to be affected by configuration of the service; obtaining policing information associated with the service access point from a router of the switching network; assigning the service access point to a policy group depending upon the policy information; updating, on the router in accordance with the assignment, provisioning information associated with the service access point to configure the service.

BRIEF DESCRIPTION OF THE DRAWINGS

The foregoing and other objects, features and advantages of the invention will be apparent from the following more particular description of the preferred embodiments, as illustrated in the appended drawings, where.

In the figures like features are denoted by like reference characters.

DETAILED DESCRIPTION

Figure 1:
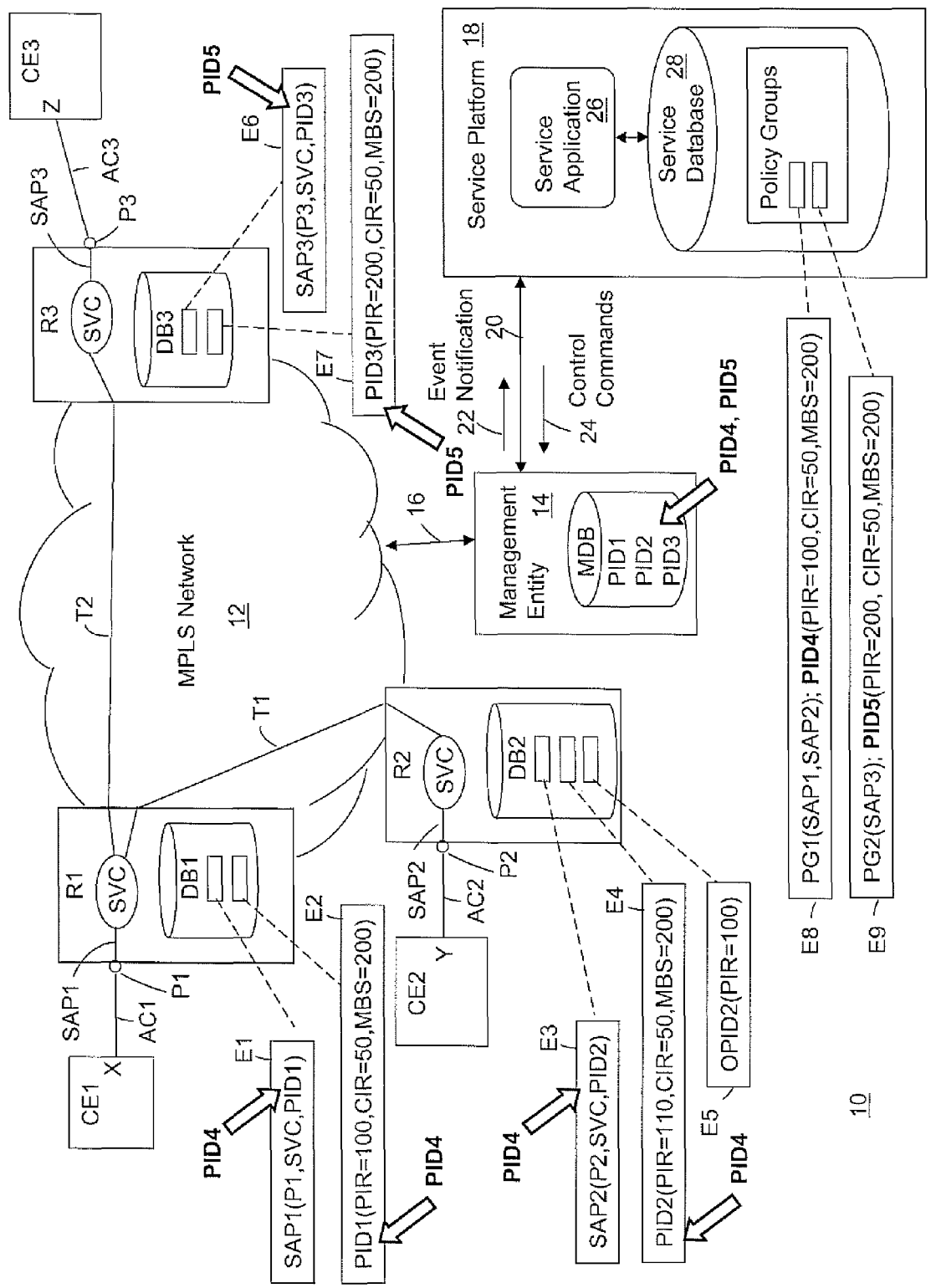
FIG. 1 illustrates a network configuration according to a first embodiment of the invention.

Referring to FIG. 1, a network configuration 10 for providing a VPLS service over an MPLS network 12 includes a first pseudowire tunnel T1 routed through the MPLS network 12 between a first provider edge router R1 and a second provider edge router R2. A service instance SVC of the VPLS service is instantiated at each of the provider edge routers R1, R2 and associates the first pseudowire tunnel T1 with the VPLS service. Accordingly, data packets associated with the VPLS service are communicated through the MPLS network 10 via the first pseudowire tunnel T1 between the first and second provider edge routers R1, R2.

The MPLS network 10 also includes a second pseudowire tunnel T2 routed through the MPLS network 12 between the first provider edge router R1 and a third provider edge router R3. A service instance SVC of the VPLS service is instantiated at the third provider edge router R3 and associates the second pseudowire tunnel T2 with the VPLS service. Accordingly, data packets associated with the VPLS service may also be communicated through the MPLS network 10 via the second pseudowire tunnel T2 between the first and third provider edge routers R1, R3.

A first customer edge router CE1 is connected to a first interface port P1 of the first provider edge router R1 via a first attachment circuit AC1. The first customer edge router CE1 has a first MAC address X. Similarly, a second customer edge router CE2 is connected to a second interface port P2 of the second provider edge router R2 via a second attachment circuit AC2. The second customer edge router CE2 has a second MAC address Y.

A first service access point SAP1 associates the first interface port P1 with the VPLS service SVC. The first provider edge router R1 includes a first database DB1 associated with the service instance SVC. The first database DB1 includes information that associates the service SVC provisioned on the first PE router R1 with the first pseudowire tunnel T1. Data packets received at the first port P1 from the first attachment circuit AC1 that are associated with the VPLS service SVC are forwarded to the primary pseudowire tunnel T1 in accordance with the information in the first database DB1. Such information includes the forwarding information, which in this case causes data packets with a source MAC address being the first MAC address X to be forwarded over the first pseudowire tunnel T1 when their destination MAC address is the second MAC address Y. Similarly, data packets associated with the VPLS service SVC received by the first provider edge router R1 from the first pseudowire tunnel T1 are forwarded to the first interface port P1 in accordance with information in the first database DB1 and the first service access point SAP1.

Similarly, a second service access point SAP2 associates the second interface port P2 with the VPLS service SVC, such that data packets received at the second port P2 from the second attachment circuit AC2 that are associated with the VPLS service SVC are forwarded to the first pseudowire tunnel T1 in accordance with information in the second database DB2. Such information includes forwarding information, which in this case causes data packets with a source MAC address being the second MAC address Y to be forwarded over the pseudowire tunnel T1 when their destination MAC address is the first MAC address X. Similarly, data packets associated with the VPLS service SVC received by the second provider edge router R2 from the first pseudowire tunnel T1 are forwarded to the second interface port P2 in accordance with information in the second database DB2 and the second service access point SAP2.

Typically, there would be multiple pseudowire tunnels connecting multiple provider edge routers. In some cases these tunnels form a fully connected mesh interconnecting the provider edge routers. In any case, when there are multiple pseudowire tunnels for a given service that terminate on a provider edge router, a database is used at that router to determine over which of the tunnels a data packet should be forwarded to reach its destination. This determination is made based on the destination MAC or IP address of the data packet. A MAC address is a 48 bit address that is generally unique and dedicated to a given network interface card or adapter of a data communication system. A MAC address is also known as a hardware address. An IP address is a 32 bit (IPv4) or 128 bit (IPv6) address that is generally unique to a network interface or system but is assignable in software.

In view of foregoing it should be clear that data packets associated with the VPLS service SVC can be communicated between the first and second customer edge routers CE1, CE2 via their respective attachment circuits AC1, AC2, the first and second provider edge routers R1, R2, and the first pseudowire tunnel T1.

A third customer edge router CE3 is connected to the third provider edge router R3 via a third attachment circuit AC3 connected to a third interface port P3 at the third provider edge router R3. The third customer edge router CE3 has a third MAC address Z. In a similar manner as described earlier for the first and second service access points SAP1, SAP2, a third service access point SAP3 associates the third interface port P3 with the VPLS service SVC instantiated on the third provider edge router R3.

The third service access point SAP3 associates the third interface port P3 with the VPLS service SVC. The third provider edge router R3 includes a third database DB3 associated with the service instance SVC. The third database DB3 includes information that associates the VPLS service SVC provisioned on the third provider edge router R3 with the second pseudowire tunnel T2. Data packets received at the third port P3 from the third attachment circuit AC3 that are associated with the VPLS service SVC are forwarded to the second pseudowire tunnel T2 in accordance with information in the first database DB1. Such information includes forwarding information, which in this case causes data packets with a source MAC address being the third MAC address Z to be forwarded over the second pseudowire tunnel T2 when their destination MAC address is the first or second MAC addresses X, Y. Similarly, data packets associated with the VPLS service SVC received by the third provider edge router R3 from the second pseudowire tunnel T2 are forwarded to the third interface port P3 in accordance with information in the third database DB3 and the third first service access point SAP3.

As mentioned previously, the databases DB1 to DB3 include information that associates their respective service access points SAP1 to SAP3 and respective ports P1 to P3 with the VPLS service SVC. For example, the first database DB1 includes a first entry E1 that associates the first service access point SAP1 with the first interface port P1 and VPLS service SVC, as well as a an identifier of a first policy PID1 on the first PE router R1. A second entry E2 in the first database DB1 includes quality of service parameters of the first policy PID1. For example these QoS parameters have the values PIR=100 kilobits per second (Kbps), CIR=50 Kbps, and MBS=200 Kbps.

Similarly, the second database DB2 includes a third entry E3 that associates the second service access point SAP2 with the second interface port P2 and VPLS service SVC, as well as an identifier of a second policy PID2 on the second PE router R2. A fourth entry E4 in the second database DB2 includes quality of service parameters for the second policy PID2. For example these QoS parameters have the values PIR=110 kilobits per second (Kbps), CIR=50 Kbps, and MBS=200 Kbps. The second database DB2 has a fifth entry E5 which is an override policy OPID2 of the second policy PID2. For example, the fifth entry E5 defines a PIR=100 Kbps, which overrides the PIR value in the fourth entry E4.

Similarly, the third database DB3 includes a sixth entry E6 that associates the third service access point SAP3 with the third interface port P3 and VPLS service SVC, as well as an identifier of a third policy PID3 on the third PE router R3. A seventh entry E7 in the third database DB3 includes quality of service parameters for the third policy PID3. For example these QoS parameters have the values PIR=200 kilobits per second (Kbps), CIR=50 Kbps, and MBS=200 Kbps.

Still referring to FIG. 1, the network configuration 10 includes a management entity 14 that is communicatively coupled to the provider edge routers R1 to R3 via a control connection 16 and the MPLS network 12. The management entity 14 would typically be a network management system capable of performing operation, administration and maintenance (OAM) type functions on network elements in the MPLS network 12 such as the provider edge routers R1 to R3. This functionality of the management entity 14 includes the capability to receive reports of equipment, service, and provisioning related events from network elements of the MPLS network 12. The management entity 14 includes a management database MDB, which includes entries for the first, second, and third policies PID1 to PID3 and their respective QoS parameter values.

The network configuration 10 also includes a service platform 18 that is communicatively coupled to the management entity 14 via an open operating system (OS) interface 20. Using the open OS interface 20, the service platform 18 has access to event notifications 22, which include event notifications related to the event reports from the network elements. Further using the open OS interface 20 the service platform 18 can issue control commands 24 to the management entity 14 including commands to effect provisioning changes at the provider edge routers R1 to R3. The service platform 18 would typically be a laptop or desktop computer or workstation. The open OS interface is an Extensible Markup Language (XML) interface, although other types of message interfaces could be used.

The service platform 18 executes a service application 26 that is in communication with a service database 28 on the service platform 18, although the service database 28 could also reside on the management entity 14 with access to it given by the open OS interface 20. The service application 26 is a software program that embodies a method of configuring services in accordance with an embodiment of the invention. The service database 28 includes information on policy groups that have been derived according to the method. For example, this information includes an eighth entry E8 for a first policy group PG1 and a ninth entry E9 for a second policy group PG2.

As indicated by the eighth entry E8, the first policy group PG1 is associated with the first and second service access points SAP1, SAP2. A fourth policy PID4 has been created based on QoS parameter values of the first and second policies PID1, PID2 that are in common after taking any related override policies into account, specifically in this case the override policy OPID2. For example, the values of the QoS parameters of the fourth policy PID4 are PIR=100, CIR=50, and MBS=200. Similarly, as indicated by the ninth entry E9, the second policy group PG2 is related to the third service access point SAP3. A fifth policy PID5 has been created based on QoS parameter values of the third policy PID3. The steps performed in order to derive the policy groups PG1, PG2 will be described in more detail later with reference to FIG. 2.

After creating the policy groups PG1, PG2 the service application 26 issues control commands 24 to the management entity 14 to cause their associated respective policies PID4, PID5 to replace in the PE routers R1 to R3 and management database MDB the policies PID1 to PID3 on which the policy groups PG1, PG2 were based. This is indicated in FIG. 1 by the bold arrows and text. This replacement operation uses the identifiers of the policies to be replaced PID1 to PID3, and may also use the service access points SAP1 to SAP3 for further correlation between the incoming PID4, PID5 and outgoing policies PID1 to PID3. For example, to make the replacement an identifier of the fourth policy PID4 replaces that of the first and second policies PID1, PID2 in the first and third entries E1, E3, respectively. Additionally, the policy information of the fourth policy PID4, such as the values of the QoS parameters PIR=100, CIR=50, MBS=200, replace those of the first and second policies PID1, PID2 in the second and fourth entries E2, E4, respectively. In some cases, the policy information of the policy associated with the policy group to which the SAP is assigned may already exist on the router, in which case the policy previously associated with the SAP can be deleted if it is not associated with any other SAPs on the router. For example, if the fourth policy PID4 already existed on the first router R1 then the first policy PID1 of the second entry E2 could be deleted because that policy is not associated with any other SAP on the first router R1. Likewise, the same is true of unused policies in the management database MDB. The override policy OPID2 is removed by deleting the fifth entry E5. Furthermore, an identifier of the fifth policy PID5 replaces that of the third policy PID3 in the sixth entry E6. Additionally, the policy information of the fifth policy PID5, such as the values of the QoS parameters PIR=200, CIR=50, MBS=200, replace those of the third policy PID3 in the seventh entry E7. Finally, the fourth and fifth policies PID4, PID5 with there associated QoS parameter values replace the first, second, and third policies PID1, PID2, PID3 in the management database MDB.

Figure 2:
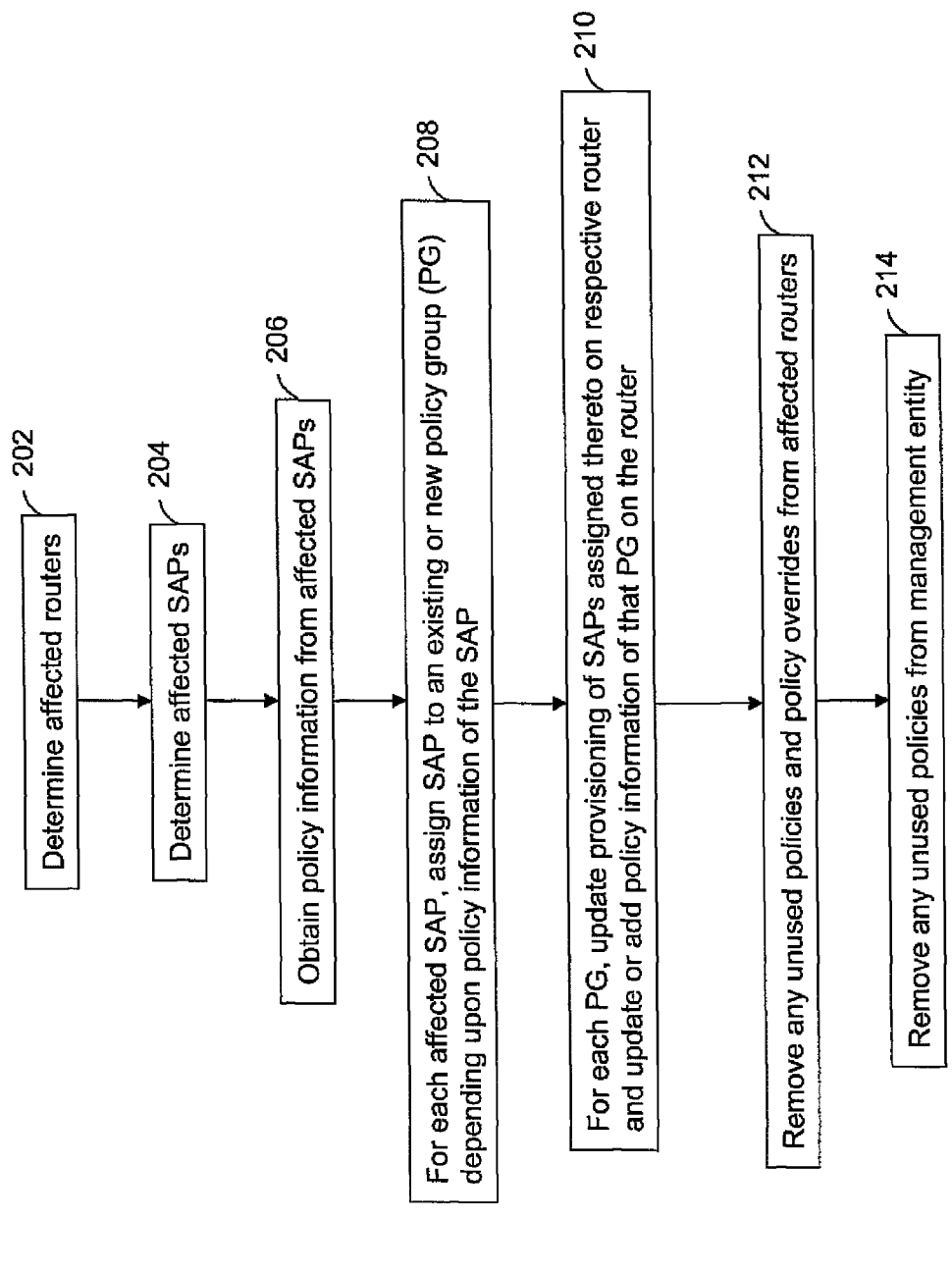
FIG. 2 illustrates a method of configuring services in a packet switching network according to a second embodiment of the invention.

Referring to FIG. 2, a method 200 of configuring services in a packet switching network will now be described with additional reference to FIG. 1. The method 200 includes an initial step of determining 202 routers that may be affected by operations that are carried out as part of the configuration of the services. This determination 202 could be the result of user input at the service platform 18 or management entity 14. For example, an operator could specify the affected provider edge routers R1 to R3. Additionally or alternatively, the affected routers could be derived by the service application 26 from event notifications 22 received over the open OS interface 20. In this case the service application 26 would check the event notifications 22 to determine if any of them relate to provisioning of a policy or an override policy at the provider edge routers R1 to R3 or at the management entity 14. In the affirmative, the affected routers would be determined from the event notifications 22, either directly if explicitly indicated in the event notifications 22 or indirectly via information stored in the management database MDB or service database 28. The service application 26 may additionally send control commands 24 to the management entity 14 to cause the management entity 14 to extract any relevant policy or policy override provisioning information from any router related to the event notifications 22, or from the management entity 14 itself.

The method then proceeds to determining 204 service access points that may be affected by operations that are carried out as part of the configuration of the services. Typically, determining 204 the affected SAPs would be done based on the determination 202 of the affected routers. For example, the service application would send control commands 24 to the management entity to query which SAPs are provisioned on the affected routers. However, as with the prior step of determining 202 affected routers, the present step of determining 204 affected SAPs could be the result of user input at the service platform 18 or management entity 14. For example, an operator could specify the affected service access points SAP1 to SAP3. Additionally or alternatively, the affected SAPs could be derived by the service application 26 from event notifications 22 received over the open OS interface 20. In either of the latter two cases, it is therefore possible to omit from the method 200 the step of determining 202 the affected routers.

The method then proceeds to obtain 206 policy information related to the affected SAPs. For example, the service application 26 issues control commands 24 to cause the management entity 14 to query network routers R1 to R3 for this policy information, such as that in the second, fourth, fifth, and seventh entries E2, E4, E5, E7, and provide the policy information to the to the service application 26.

The method then proceeds to assigning 208 each affected SAP to an existing or new policy group depending upon the policy information obtained 206 in the previous step. This step is performed by the service application 26 on any given SAP by first applying to a policy specified for the SAP all override policies that correspond to that policy in order to update that policy, before searching in the service database 28 for a policy group that has QoS parameters that match those of the updated policy. If a matching policy group is found the SAP is assign to that matching policy group, otherwise a new policy group is created and the SAP is assigned to the new policy group. For example, in the case of the second service access point SAP2, the value of the QoS parameter PIR=110 in the second policy PID2 is updated by the override policy OPID2, which has a QoS parameter value of 100. The updated second policy has QoS parameter values PIR=100, CIR=50, MBS=200, which match those of the first policy group PG1. The service application 26 therefore assigns the second service access point SAP2 to the first policy group PG1, which is associated with the fourth policy PID4. In a similar manner the first service access point SAP1 is assigned to the first policy group PG1, and the third service access point SAP3 is assigned to the fifth policy PID5.

For each policy group and for each SAP assigned thereto, the method then proceeds to update 210 provisioning information of the SAP on a respective router with an identifier of the policy associated with the policy group as well update on the router any existing, or add any non-existing, policy information of the associated policy. For example regarding the first policy group PG1, the service application 26 issues control commands 24 to cause the management entity 14 to update provisioning information of the first service access point SAP1 in the first entry E1 by replacing the identifier of the first policy PID1 with that of the fourth policy PID4. Likewise, the policy information of the fourth policy PID4 is added to the first router R1 by replacing the information of the first policy PID1 in the second entry E2 with that of the fourth policy PID4. In a similar manner, the provisioning information of the second access point SAP2 is updated in the second router to reflect assignment of the second service access point SAP2 to the first policy group PG1. Likewise, the provisioning information of the third access point SAP3 is updated in the third router to reflect assignment of the third service access point SAP3 to the second policy group PG2.

The method then proceeds to remove 212 any unused policies and policy overrides from routers affected by the updating 210 of provisioning information of the previous step. For example, the service application 26 issues control commands 24 to cause the management entity to remove the override policy OPID2 of the fifth entry E5.

Finally, any unused policies are removed 214 from the management entity 14. For example, the service application 26 issue control commands 24 to cause the management entity to remove the first, second, and third policies PID1, PID2, PID3 from its management database MDB.

By executing the method 200, the service platform 18 provides several advantages such as: more consistent use of policies on a network-wide basis, efficient use of NM system resources to help avoid exceeding NM system policy limits, and keeping router and NM system policies in synchronization. For example, with regard to the network configuration of FIG. 1, the total number of policies and policy overrides was reduced by 50%; from four to two. Although this was a simplistic example, it should illustrate that advantages provided by embodiments of the invention applied to a network with thousands of policies and routers can be quite significant.

Figure 3:
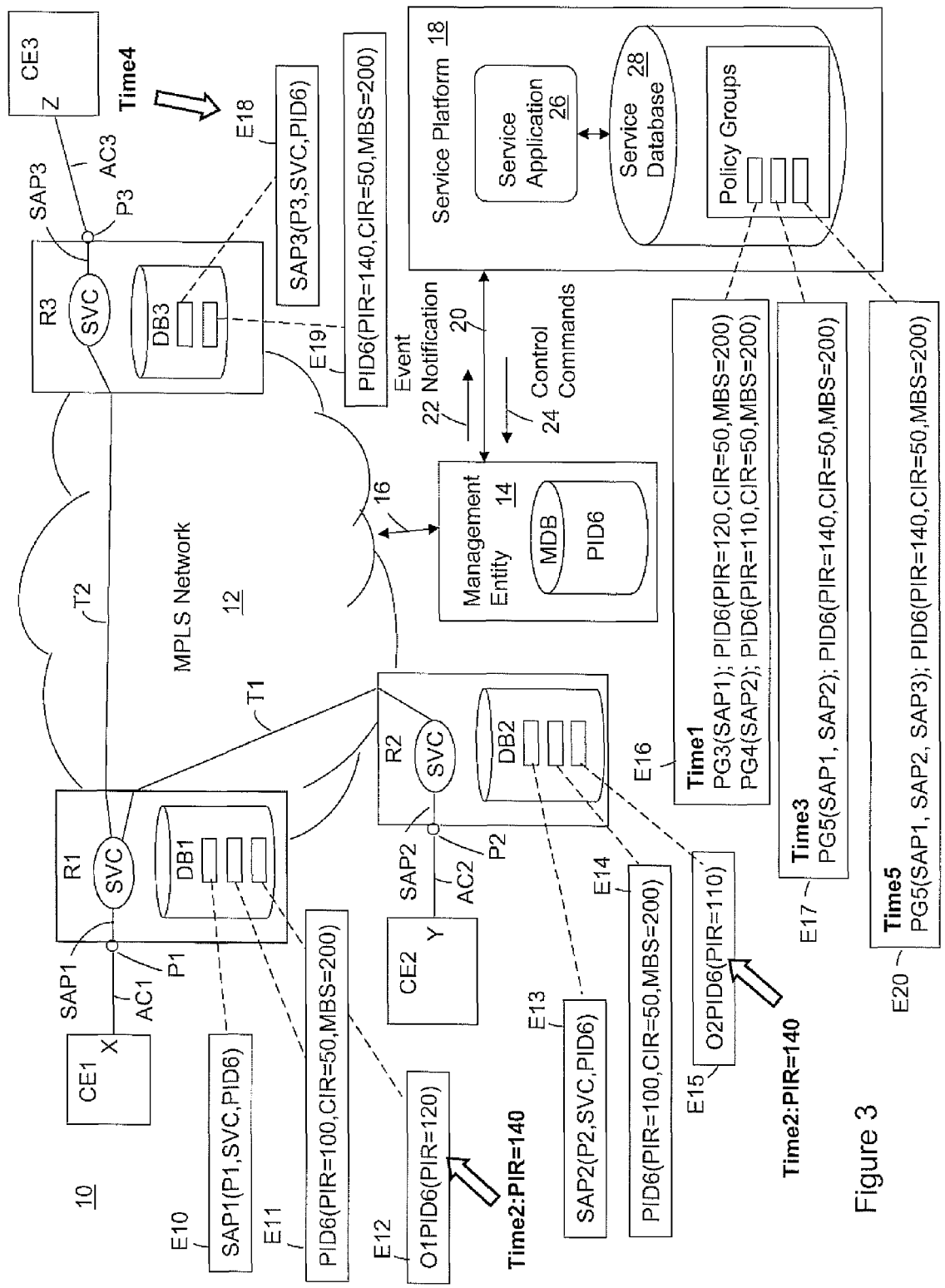
FIG. 3 illustrates a network configuration according to a third embodiment of the invention.

Referring to FIG. 3, the network configuration 10 is the same as that in FIG. 1 except for the first to ninth entries E1 to E9 in the in the first to third databases DB1 to DB3 and service database 28 have been replaced with new entries, as will be explained in the following description. Some of these new entries have content that is changed at various points in time, while others are added or removed at various points in time. The points in time are sequential and are designated respectively as first to fifth time points Time1 to Time5.

According to FIG. 3, the first database DB1 has a tenth entry E10 that associates the first access point SAP1 with a sixth policy PID6. An eleventh entry E11 in the first database defines QoS parameters of the sixth policy PID6 to be PIR=100, CIR=50, and MBS=200. A twelfth entry E12 in the first database DB1 defines a first override O1PID6 for the sixth policy PID6, wherein a first override PIR value is defined as PIR=120. Likewise, the second database DB2 has a thirteenth entry E13 that associates the second access point SAP2 with the sixth policy PID6. A fourteenth entry E14 in the second database defines QoS parameters of the sixth policy PID6 to be PIR=100, CIR=50, and MBS=200. A fifteenth entry E15 in the second database DB2 defines a second override O2PID6 for the sixth policy PID6, wherein a second override PIR value is defined as PIR=110.

At the first time point Time1, the service application 26 obtains policy information regarding the first and seconds service access points SAP1, SAP2 from the first and second databases DB1, DB2 in a manner as previously described with reference to FIG. 1 and FIG. 2. The service application applies the first and second overrides for the sixth policy O1PID6, O2PID6 before assigning the first and second access points SAP1, SAP2 to new or existing policy groups, again in the same manner as previously described. The resultant policy group assignment is stored in the service database 28, for example as a sixteenth entry E16. In this case two new policy groups are created, a third policy group PG3 for the first service access point SAP1 and a fourth policy group PG4 for the second service access point because of their different PIR values that result when their respective override policies O1PID6, O2PID6 are applied.

At the second time point Time2, the first override PIR in the twelfth entry E12 is changed to 140, and the second override PIR in the fifteenth entry E15 is also changed to 140. These changes are shown in the figure by the boldface arrow and text.

At the third time point Time3 the service application 26 again obtains policy information regarding the first and second service access points SAP1, SAP2 from the first and second databases DB1, DB2. The service application 26 applies the first and second PIR overrides (PIR=140) before assigning the first and second access points SAP1, SAP2 to new or existing policy groups. The resultant policy group assignment is stored in the service database 28, for example as a seventeenth entry E17 which replaces the sixteenth entry E16 since that entry is no longer relevant. In this case a new policy group is created, a fifth policy group PG5, and both the first and second service access points SAP1, SAP2 are associated with this group PG5. For clarity of this description the new policy group was assigned a new number, e.g. PG5, however it should be appreciated that an already used policy group number could have been used, e.g. PG3, PG4, if all entries specifying that policy group have already been deleted (e.g. E16) from the service database 28.

At the fourth time point Time4, the third database is provisioned with the third service access point SAP3 and policy information that associates it with the sixth policy PID6. This result of this provisioning is shown as an eighteenth entry E18, which defines the third service access point SAP3 and associates it to the sixth policy PID6, and a nineteenth entry E19, which provides the QoS parameters of the sixth policy as being PIR=140, CIR=50, MBS=200. This provisioning could be accomplished by entering information of the eighteenth and nineteenth entries directly at the third router R3, or entering that information at the management entity 14, or by specifying at the service platform 18 that the information of the fifth policy group PG5 should be used. In the later case, the provisioning would be effected as previously described, that is, by the service application 26 issuing control commands 24 to the management entity 14 to effect the provisioning.

At the fifth time point Time5, the service application 26 obtains policy information regarding the first to third service access points SAP1 to SAP3 from the first to third databases DB1 to DB3. The service application 26 applies the first and second PIR overrides (PIR=140) before assigning the first and second access points SAP1, SAP2 to new or existing policy groups. The resultant policy group assignment is stored in the service database 28, for example as a twentieth entry E20 which replaces the seventeenth entry E17 since that entry is no longer relevant. In this case an existing policy group is used, the fifth policy group PG5, and the first to third service access points SAP1 to SAP3 are assigned with this group PG5 since the policy information of each specifies the same policy, the sixth policy PID6, and their QoS parameters have the same values, namely PIR=140, CIR=50, and MBS=200.

From the foregoing description with reference to FIG. 3, it should be appreciated the service application 26 with the method of configuring services that it embodies, is useful for promoting consistent use of policies on a network-wide basis, both in dealing with override policies on existing services, e.g. with regard to the first and second routers R1, R2, and in adding new services, e.g. with regard to the third router R3. The policy groupings, e.g. PG1 to PG5, in the service database 28 can be considered as virtual groups in that they are not configured directly per se on the network routers, e.g. R1 to R3, and the management entity 14, but rather are created dynamically when needed, for example at request of a user or responsive to a configuration change detected via an event notification 22.

Numerous modifications, variations and adaptations may be made to the embodiment of the invention described above without departing from the scope of the invention, which is defined in the claims.

What is claimed is:

1. A method performed by a service platform for configuring a service in a packet switching network, said method comprising the steps of:
determining, by the service platform, a service access point to be affected by configuration of the service;
obtaining policy information associated with the service access point from a router of the packet switching network;
assigning the service access point to a policy group depending upon the policy information;
updating, by the router of the packet switching network, provisioning information associated with the service access point to configure the service based on the assignment of the service access point to the policy group.

2. The method of claim 1, wherein the step of determining comprises receiving a notification of a configuration change associated with the service access point.

3. The method of claim 1, wherein:
the step of obtaining comprises receiving an override policy affecting the service access point; and
the step of assigning comprises applying the override policy to the policy information.

4. The method of claim 3 further comprising removing the override policy from the router of the packet switching network.

5. The method of claim 1, wherein the step of updating comprises changing the policy information to be in accordance with a policy associated with the policy group.

6. The method of claim 1, wherein the step of updating comprises removing the policy information from the router when a policy associated with the policy group already exists on the router of the packet switching network.

7. The method of claim 1, wherein the method further comprises removing the policy information from a management entity of the packet switching network when a policy associated with the policy group already exists on the management entity.

8. A system for configuring a service in a packet switching network, said system comprising:

an operating system interface communicatively coupling to a network management entity of the packet switching network; and a memory including a service database for storing a plurality of policy groups and their associated policies, a processor for executing a service application. wherein the service application:

determines a service access point to be affected by configuration of the service;

obtains, via the operating system, policy information associated with the service access point from a router of the packet switching network interface;

assigns the service access point to a policy group depending upon the policy information; and updates, via the operating system interface, on the router of the packet switching network in accordance with the assignment, provisioning information associated with the service access point to configure the service.

9. The system of claim 8, wherein with regard to the determining action, the operating system interface is configured to receive from the management entity a notification of a configuration change associated with the service access point.

10. The system of claim 8, wherein:

with regard to the obtaining action, operating system interface is configured to receive from the management entity an override policy affecting the service access point; and with regard to the assigning action, the service platform is operable to apply the override policy to the policy information before making the assignment.

11. The system of claim 10 wherein the processor executing the service application is configured to cause the override policy to be removed from the router.

12. The system of claim 8, wherein with regard to the updating action, the processor executing the service application is configured to cause the policy information to be updated so as to be in accordance with a policy associated with the policy group.

13. The system of claim 8, wherein the processor executing the service application is configured to cause step the policy information to be removed from the router when a policy associated with the policy group already exists on the router.

14. The system of claim 8, wherein the processor executing the service application is configured to remove the policy information from the management entity when a policy associated with the policy group already exists on the management entity.

15. A method of configuring a service in a packet switching network, comprising the steps of:

determining a service access point to be affected by configuration of the service;

obtaining group policy information associated with the service access point from a router of the packet switching network;

comparing the group policy information associated with the service access point to policy information required to provision the service in order to determine whether the group policy information associated with the service access point matches the policy information required to provision the service; and if the group policy information associated with the service access point does not match the policy information required to provision the service:

assigning the policy information required to provision the service to the service access point, and sending the policy information required to provision the service to the service access point to the router of the packet switching network.

\* \* \* \* \*